US011351845B2

(12) United States Patent
Miyake (10) Patent No.: US 11,351,845 B2
(45) Date of Patent: Jun. 7, 2022

(54) DOOR STRUCTURE (71) Applicant: HONDA MOTOR CO., LTD., Tokyo (JP)

(72) Inventor: Yoshinori Miyake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 496 days.

(21) Appl. No.: 16/468,748

(22) PCT Filed: Sep. 21, 2017

(86) PCT No.: PCT/JP2017/034136
§ 371 (c)(1),
(2) Date: Jun. 12, 2019

(87) PCT Pub. No.: WO2018/110021
PCT Pub. Date: Jun. 21, 2018

(65) Prior Publication Data
US 2020/0094658 A1    Mar. 26, 2020

(30) Foreign Application Priority Data
Dec. 14, 2016    (JP) .............................. JP2016-242409

(51) Int. Cl.
*B60J 5/10*    (2006.01)

(52) U.S. Cl.
CPC .............. *B60J 5/107* (2013.01); *B60J 5/105* (2013.01)

(58) Field of Classification Search
CPC ... B60J 5/107; B60J 5/105; B60J 5/102; B60J 5/103
See application file for complete search history.

(56) References Cited

U.S. PATENT DOCUMENTS 8,991,898 B2 *   3/2015   Iwano .................... B60J 5/0429
                                              296/146.6
9,963,021 B2 *   5/2018   Miyake ................ B62D 29/001
(Continued)

FOREIGN PATENT DOCUMENTS

DE    102011000063 A1 *   7/2012   .............. B60J 5/107
DE    102018116965 B4 *  12/2020   ........... B62D 25/105
(Continued)

OTHER PUBLICATIONS

International Search Report by ISA/JP dated Dec. 19, 2017, on PCT/JP2017/034136 (5 pages).
(Continued)

*Primary Examiner* — Marcus Menezes
(74) *Attorney, Agent, or Firm* — Rankin, Hill & Clark LLP (57) ABSTRACT

A door structure that can provide a bearing force against a load inputted from a hinge in a desirable way. The door structure includes: a tailgate; and a hinge that pivotally supports the tailgate with respect to a vehicle body. The tailgate has: an inner panel having an attachment surface portion substantially parallel to a plane whose normal is in the direction in which a rotating shaft of the hinge extends; and a hinge attachment portion, which is formed on the attachment surface portion and is for attaching the hinge thereto. The tailgate is provided with a stiffener attached together with the hinge to the tailgate. The stiffener has a first surface portion formed along the attachment surface portion.

6 Claims, 9 Drawing Sheets

(56) References Cited

U.S. PATENT DOCUMENTS

| | | | |
|---|---|---|---|
| 9,981,535 B2* | 5/2018 | Ueno | B60J 5/101 |
| 2008/0148518 A1* | 6/2008 | Munenaga | B60J 5/107 |
| | | | 16/334 |
| 2013/0285415 A1* | 10/2013 | Landholm | B62D 25/12 |
| | | | 296/193.11 |
| 2014/0097644 A1* | 4/2014 | Kurita | B60J 5/101 |
| | | | 296/193.08 |
| 2014/0210230 A1* | 7/2014 | Iwano | B60J 5/0429 |
| | | | 296/146.6 |
| 2016/0075216 A1* | 3/2016 | Kamimura | B60J 5/101 |
| | | | 296/146.2 |
| 2016/0167495 A1* | 6/2016 | Kamimura | B60J 5/0469 |
| | | | 52/309.1 |
| 2016/0236723 A1* | 8/2016 | Ikeda | B62D 25/08 |
| 2017/0174056 A1* | 6/2017 | Kuntze | B60J 5/107 |
| 2017/0174057 A1* | 6/2017 | Miyake | B60S 1/0441 |
| 2017/0174059 A1* | 6/2017 | Miyake | E05D 5/0207 |
| 2019/0193534 A1* | 6/2019 | Chiba | E05F 3/224 |

FOREIGN PATENT DOCUMENTS

| | | | | |
|---|---|---|---|---|
| FR | 2748241 A1 | * | 11/1997 | B60J 1/1861 |
| FR | 3010352 A1 | * | 3/2015 | B60J 1/18 |
| FR | 3094944 A1 | * | 10/2020 | B60J 5/0431 |
| JP | 2004-161128 A | | 6/2004 | |
| JP | 2013-082235 A | | 5/2013 | |
| WO | 2015037132 A1 | | 3/2015 | |
| WO | WO-2018108252 A1 | * | 6/2018 | B60J 5/107 |

OTHER PUBLICATIONS

Written Opinion by ISA/JP dated Dec. 19, 2017, on PCT/JP2017/034136 (4 pages).

* cited by examiner

DOOR STRUCTURE

TECHNICAL FIELD

The present invention relates to a door structure.

BACKGROUND ART

As a rear door structure for vehicles, there is known a door structure with a tailgate that can be opened and closed about an end portion thereof. The tailgate is pivotally supported by a hinge with respect to the vehicle body and has an attachment surface portion for attaching the hinge.

For example, Patent Literature 1 discloses a door structure including a rotating shaft which extends in a vehicle width direction and about which the tailgate rotates and an attachment surface portion which extends substantially parallel to the rotating shaft and to which a hinge and a stiffener is fastened together with a bolt.

CITATION LIST

Patent Literature

Patent Literature 1: Japanese Patent Laid-Open No. 2004-161128

SUMMARY OF INVENTION

Technical Problem

According to the door structure disclosed in Patent Literature 1, the hinge and the stiffener are attached to the attachment surface portion that extends substantially parallel to the rotating shaft. Thus, the direction in which the attachment surface portion and the stiffener extend is substantially perpendicular to a direction in which a force is inputted from the hinge. For this reason, the attachment surface portion and the stiffener may fail to receive the inputted load normally, and, as a result, deformation of the door may occur.

The present invention has been made in view of the above and an object of the present invention is to provide a door structure that can generate a bearing force against the load inputted from the hinge in a desirable way.

Solution to Problem

To solve the above-described problem, the present invention provides a door structure for opening and closing a door opening provided on a vehicle body, wherein the door structure has: a door body; and a hinge that pivotally supports the door body with respect to the vehicle body. The door body has an attachment surface portion substantially parallel to a plane whose normal is in a direction in which a rotating shaft of the hinge extends, and a hinge attachment portion formed on the attachment surface portion and being for attaching the hinge thereto. Incidentally, the meaning of "substantially parallel" covers a state where the plane whose normal is in the direction in which the rotating shaft extends is exactly parallel to the attachment surface portion as well as a state where the plane whose normal is in the direction in which the rotating shaft extends is not strictly parallel to the attachment surface portion but inclines with respect to them due to unavoidable manufacturing errors or the like.

Advantageous Effect of Invention

The door structure according to the present invention provides a bearing force against the load inputted from the hinge in a desirable way.

DESCRIPTION OF EMBODIMENTS

Hereinafter, an embodiment of the present invention will be described in detail with reference to the drawings. It should be noted that, "Front-Rear", "Up-Down", and "Left-Right" indicated with arrows in the drawings represent a front-rear direction of the vehicle, an up-down direction of the vehicle, and a "left-right" direction (vehicle width direction) as seen from a driver's seat, respectively.

Figure 1:
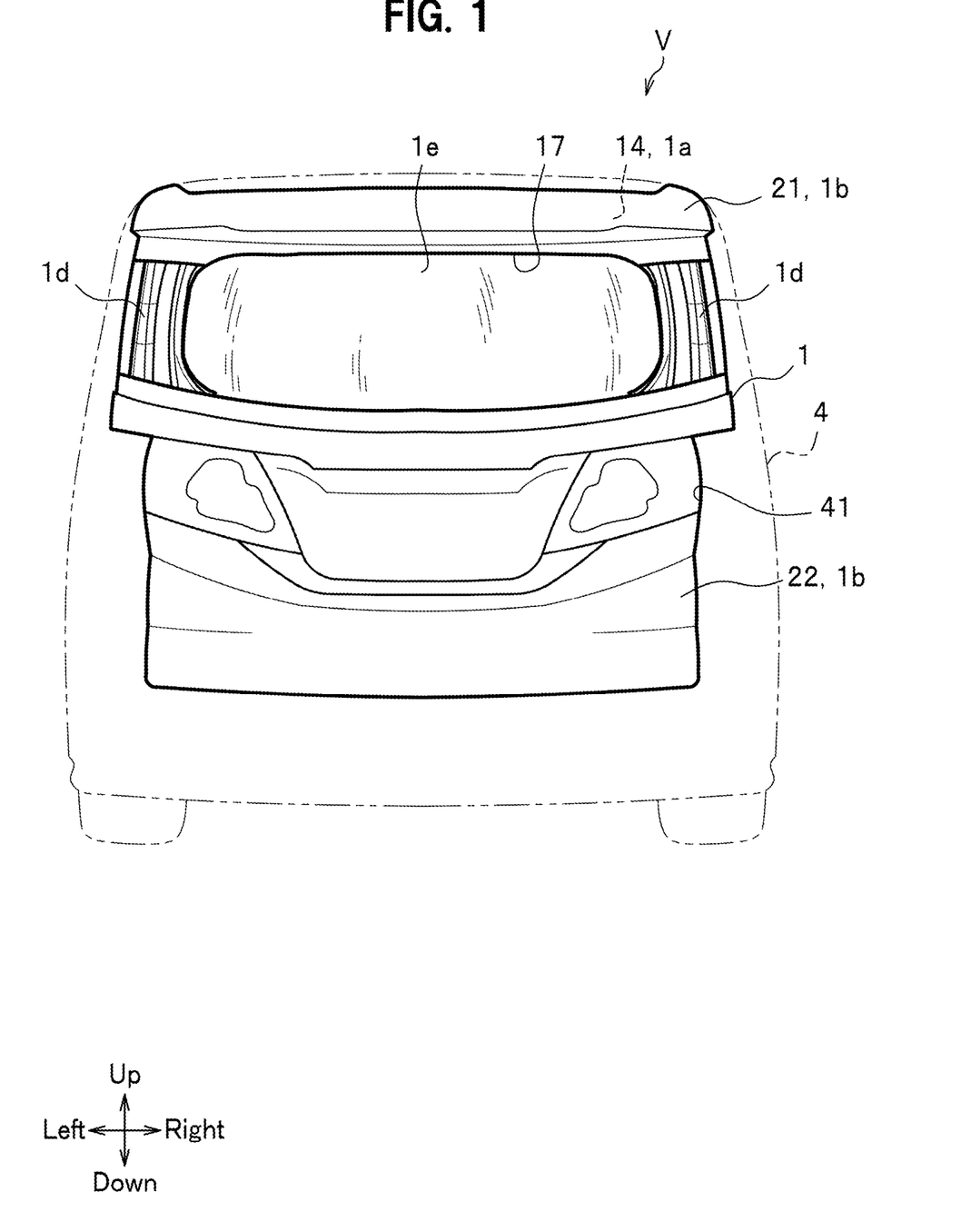
FIG. 1 is a rear view of a vehicle provided with a door structure according to an embodiment, as seen from rear.
Figure 2:
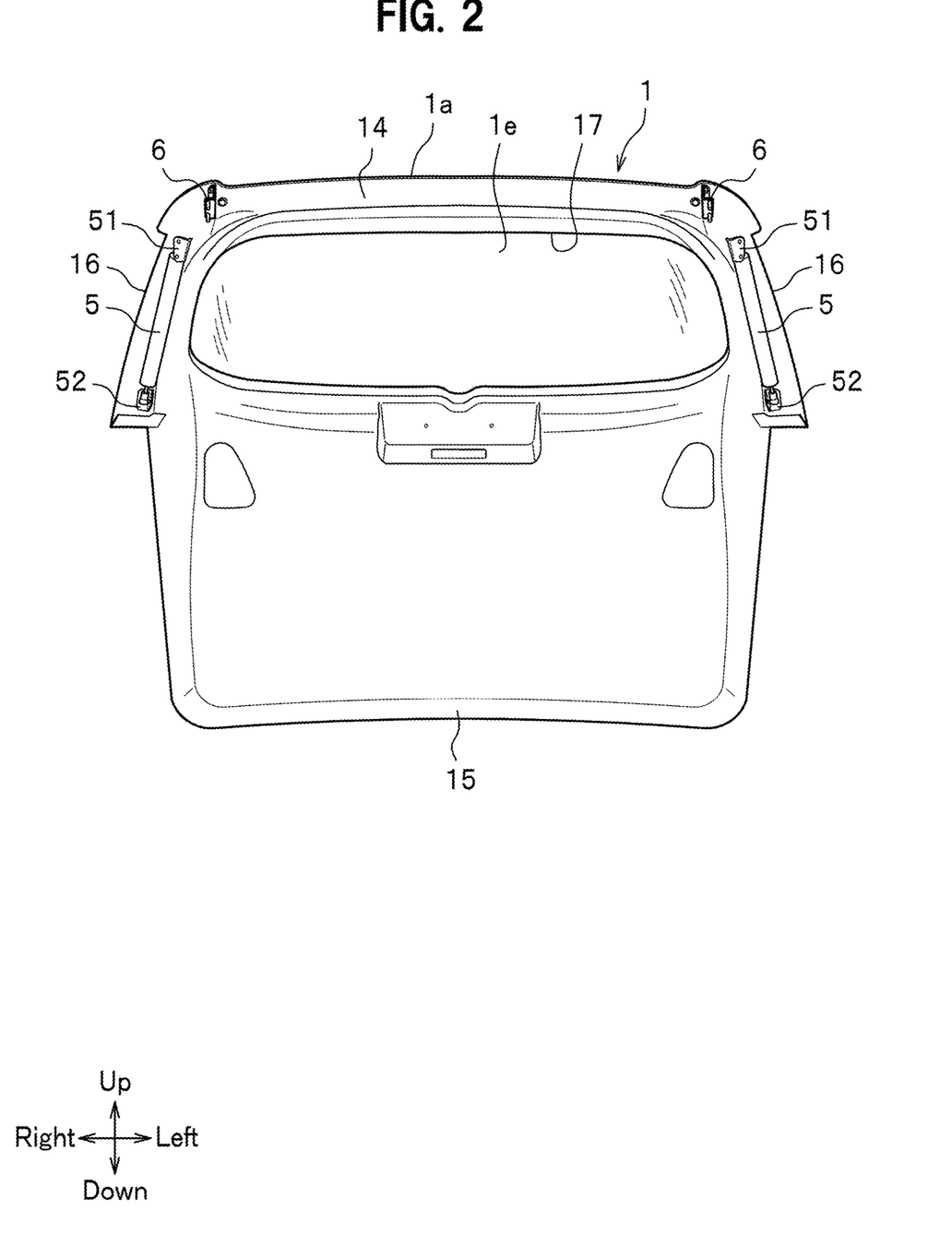
FIG. 2 is a front view of the door structure according to the embodiment, as seen from front.
Figure 3:
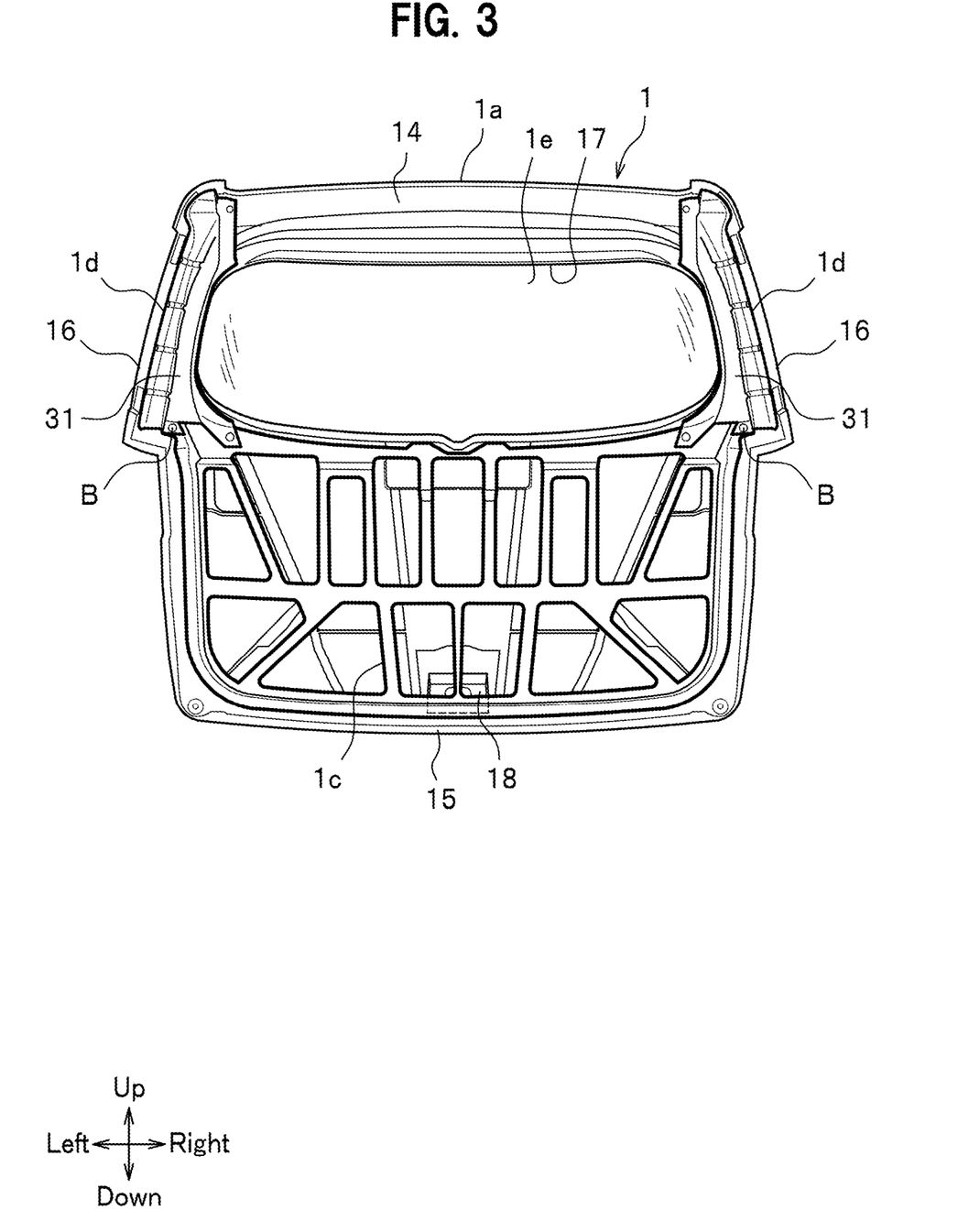
FIG. 3 is a rear view of the door structure, shown in FIG. 1, in a state where an outer panel thereof has been removed.

FIG. 1 is a rear view of a vehicle V with a door structure according to the embodiment, as seen from rear of the vehicle. FIG. 2 is a front view of the door structure according to the embodiment, as seen from front of the vehicle. FIG. 3 is a rear view of a state of the door structure where an outer panel 1b has been removed from the door structure shown in FIG. 1.

As shown in FIGS. 1 and 2, the vehicle V is a so-called hatchback vehicle. The vehicle V has a door opening 41 formed on a rear portion of a vehicle body 4, a tailgate 1 that covers the door opening 41 in an openable-closable manner, and left and right pairs of open stay 5 and hinge 6, which are attached to and between the tailgate 1 and the vehicle body 4. As the door structure of the rear portion of the vehicle V is left-right symmetric, only the left side is described and description of the right side is omitted.

The tailgate 1 is a member rotatable about one end (upper end in the embodiment). As shown in FIGS. 1 and 3, the tailgate 1 has: an inner panel 1a disposed on a forward side corresponding to the vehicle inner side; an outer panel 1b disposed on a rearward side corresponding to the vehicle outer side of the inner panel 1a; a mid panel 1c disposed between the inner panel 1a and the outer panel 1b; and stiffeners 1d disposed on a rear surface of the inner panel 1a, on vehicle width direction outer sides of a rear window glass 1e. The tailgate 1 corresponds to the door body of Claims.

The inner panel 1a shown in FIG. 3 is made of a resin material in the present embodiment. The inner panel 1a has an upper edge portion 14, a lower edge portion 15, and left and right side edge portions 16, 16, and has a substantially rectangular shape. The inner panel 1a has, on an upper end side thereof, a substantially rectangular glass opening 17 in which the rear window glass 1e is installed.

Figure 4:
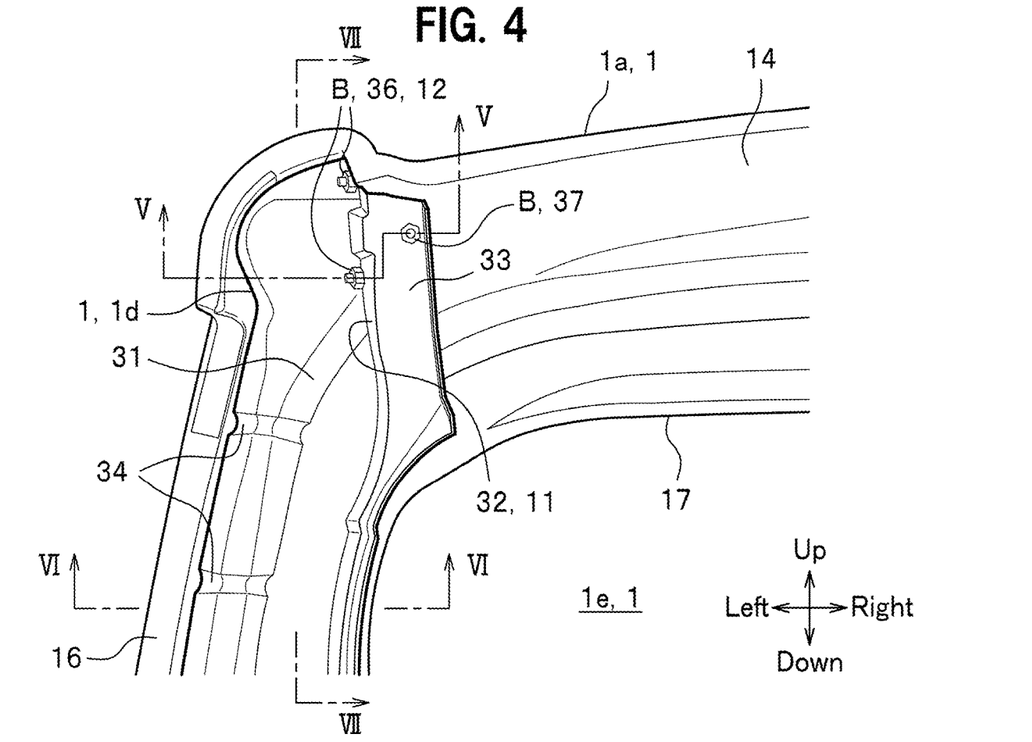
FIG. 4 is a partially enlarged view of FIG. 3.
Figure 5:
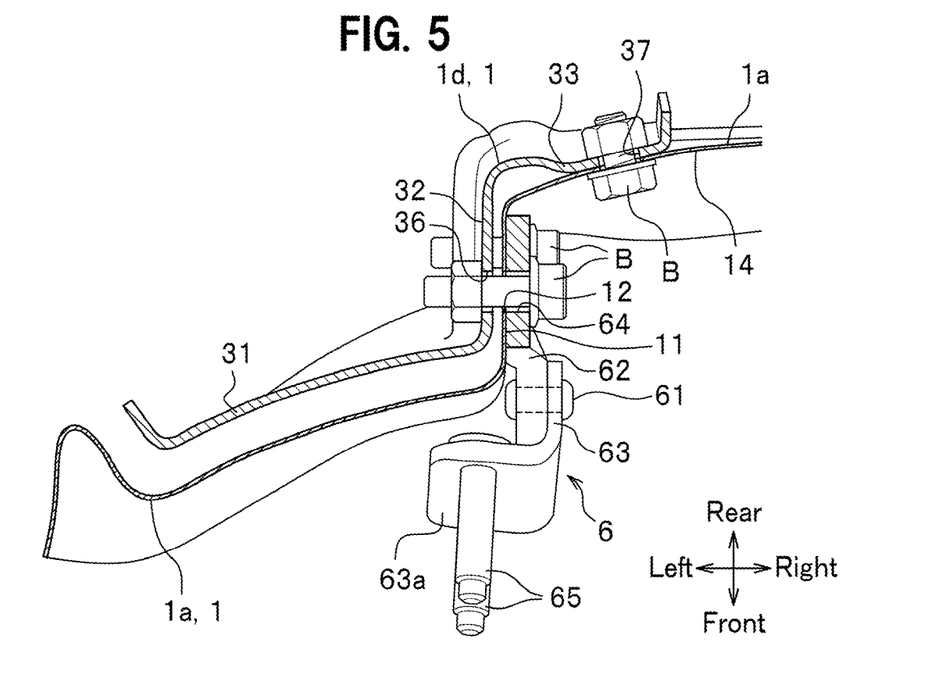
FIG. 5 is a cross-sectional view taken along line V-V in FIG. 4.
Figure 6:
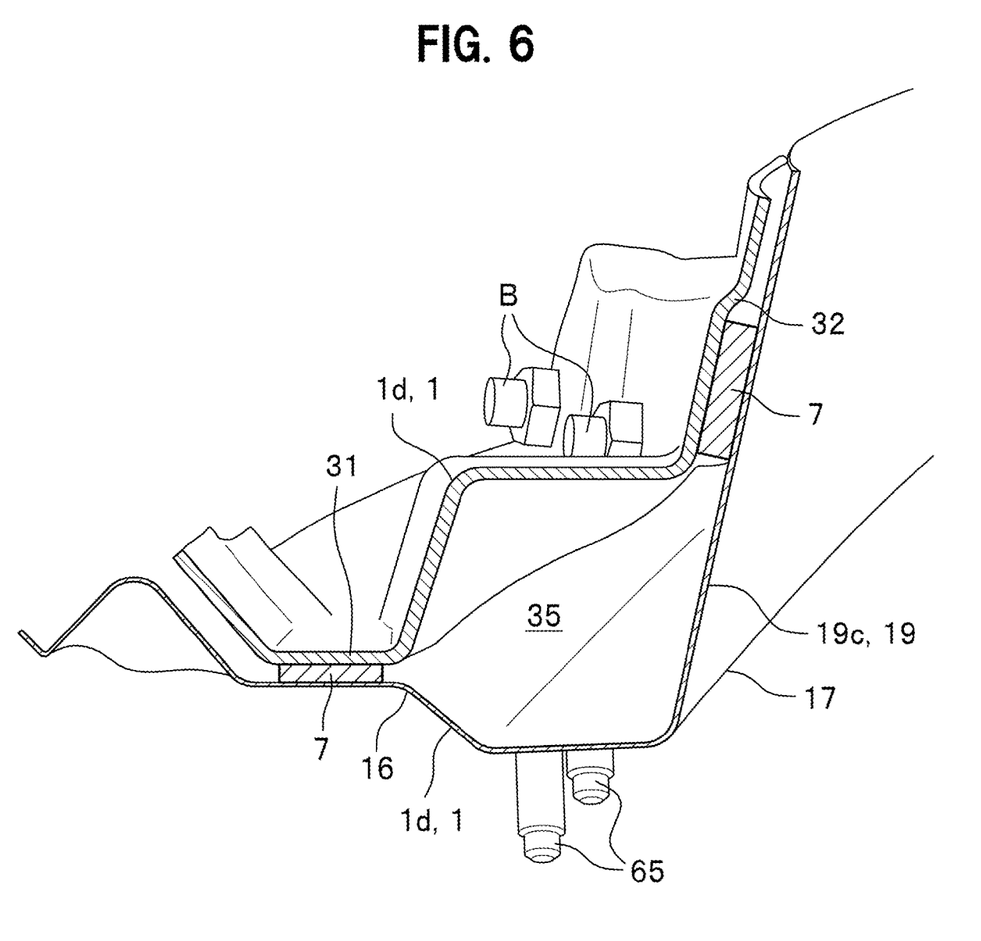
FIG. 6 is a cross-sectional view corresponding to line VI-VI in FIG. 4.
Figure 7:
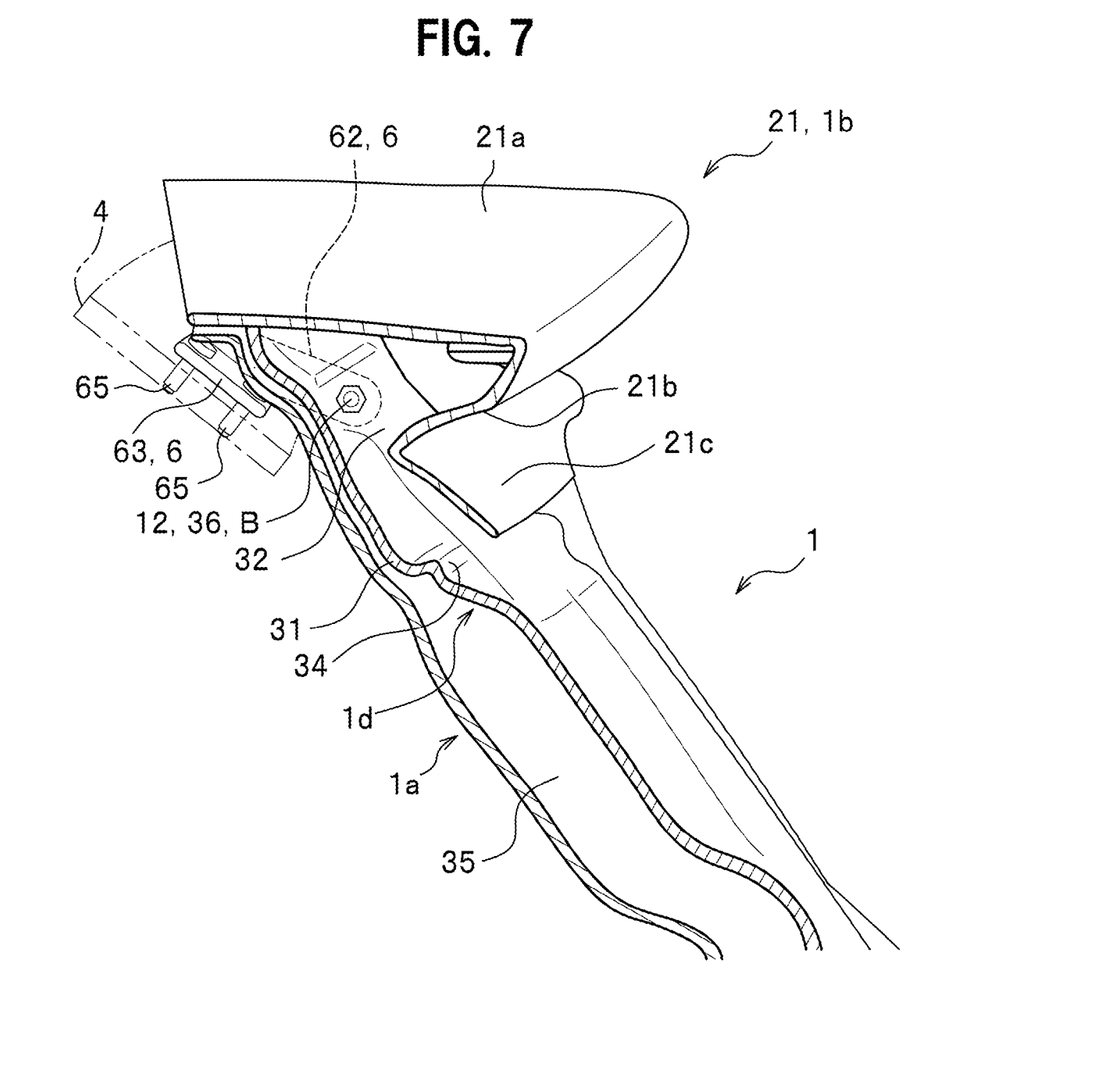
FIG. 7 is a cross-sectional view corresponding to line VII-VII in FIG. 4.

FIG. 4 is a partially enlarged view of FIG. 3. FIG. 5 is a cross-sectional view taken along line V-V of FIG. 4. FIG. 6 is a cross-sectional view corresponding to line VI-VI in FIG. 4. FIG. 7 is a cross-sectional view corresponding to line VII-VII in FIG. 4.

As shown in FIGS. 4 and 5, the inner panel 1a has an attachment surface portion 11 that extends in a direction perpendicular to the vehicle width direction, i.e., in the up-down direction and the front-rear direction, on a vehicle width direction outer side of the upper edge portion 14 of the inner panel 1a. The attachment surface portion 11 is substantially parallel to a plane whose normal is in the direction in which a rotating shaft 61, which is the rotation center of the tailgate 1, extends. The attachment surface portion 11 has a plurality of hinge attachment portions 12 each formed of a through-hole. In the present embodiment, two hinge attachment portions 12 are formed spaced apart from each other in the up-down direction.

Figure 8:
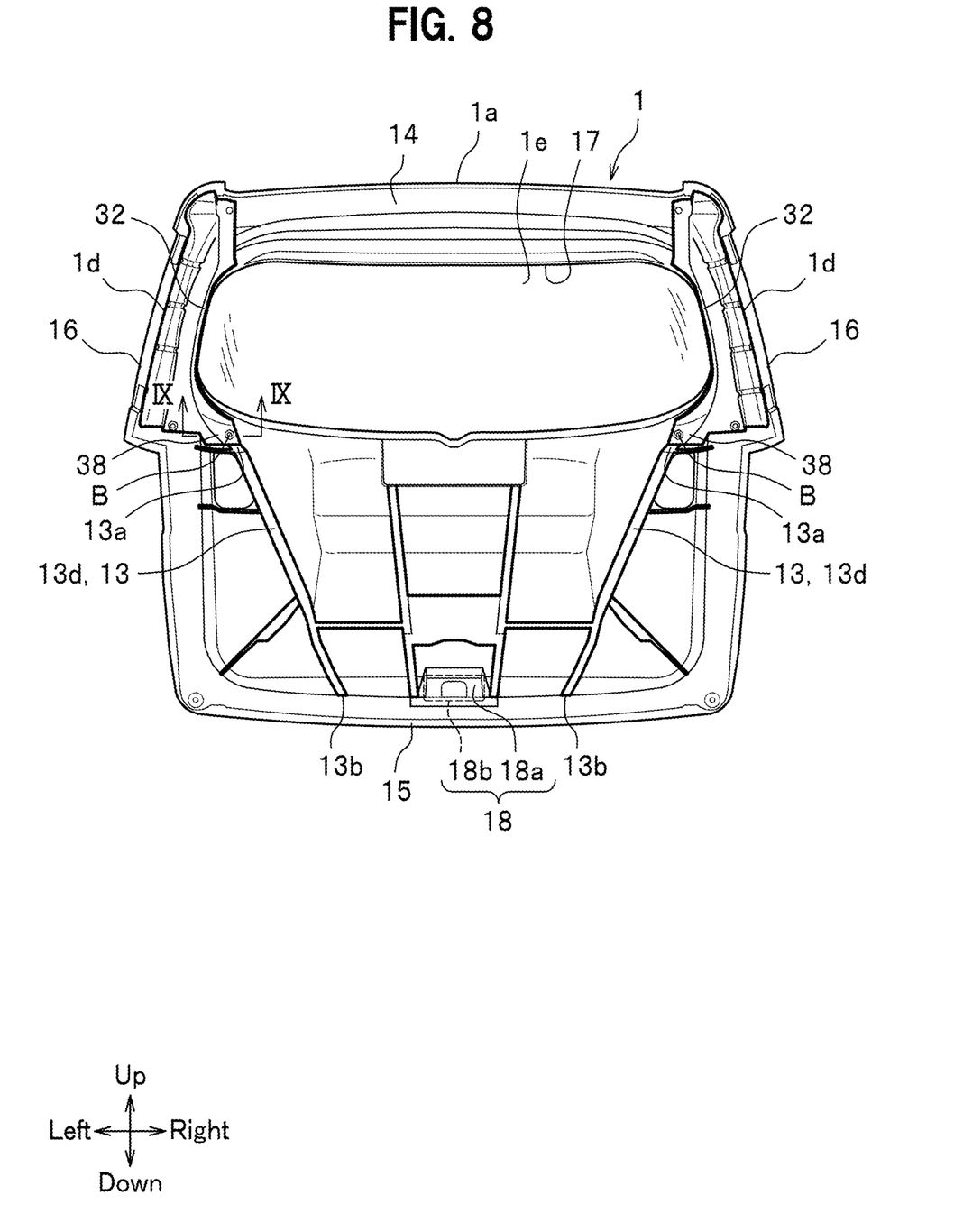
FIG. 8 is a rear view of the door structure, shown in FIG. 3, in a state where a mid panel has been removed.

FIG. 8 is a rear view of a state of the door structure where the mid panel 1c has been removed from the door structure shown in FIG. 3.

As shown in FIG. 8, at a vehicle width direction central portion of the lower edge portion 15 of the inner panel 1a, a lock device 18 that locks the tailgate 1 to the vehicle body 4 (see FIG. 1) is installed. The lock device 18 has a lock stiffener 18a fixed to the lower edge portion 15 and a latch mechanism 18b (see the dotted line in FIG. 8) fixed to the inner panel 1a via the lock stiffener 18a. The latch mechanism 18b engages with a not-shown striker installed on a lower edge portion of the door opening 41 of the vehicle body 4, in a state where the tailgate 1 is closed.

Figure 10:
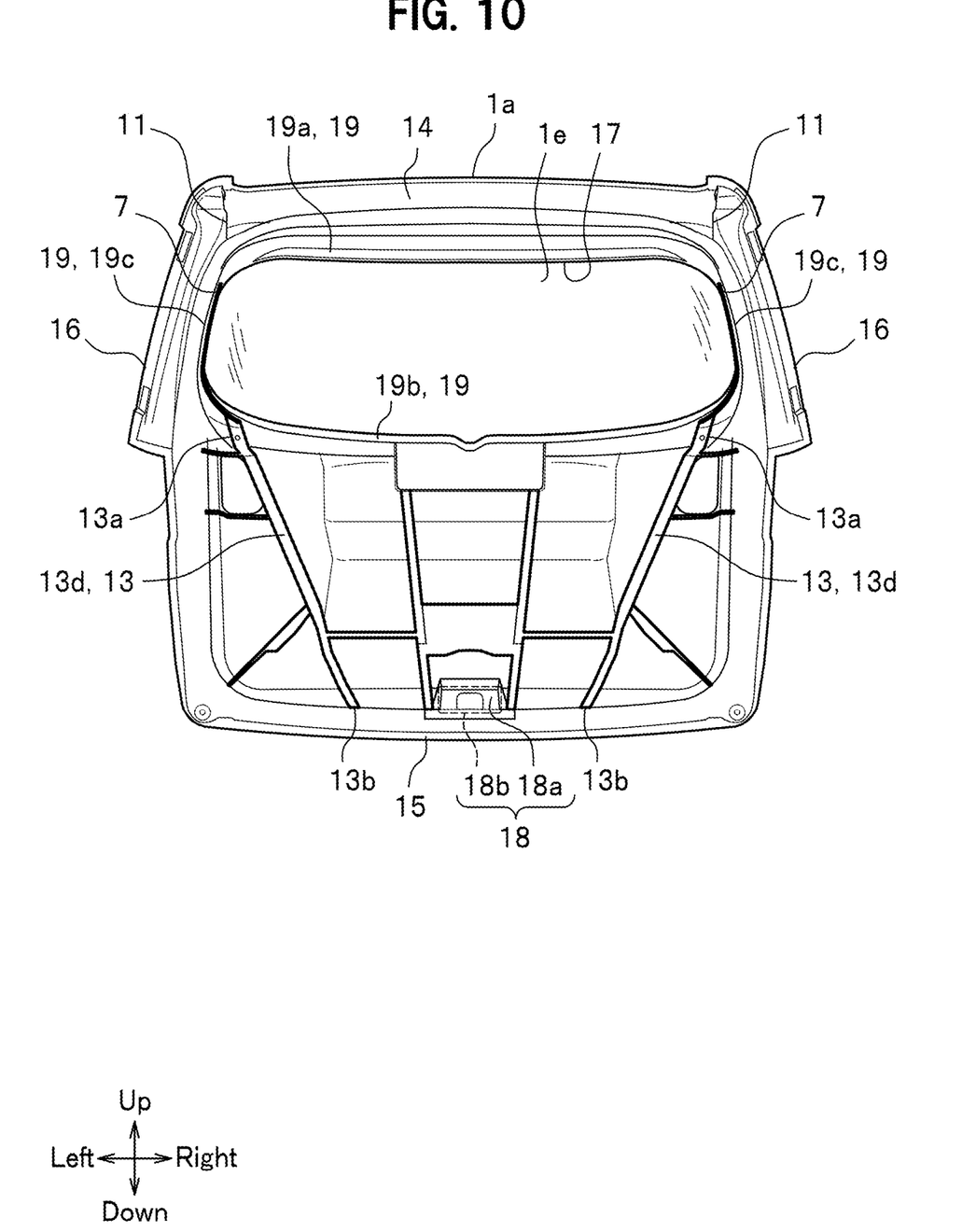
FIG. 10 is a rear view of the door structure, shown in FIG. 8, in a state where a stiffener has been removed.

FIG. 10 is a rear view of a state of the door structure where the stiffener 1d has been removed from the door structure shown in FIG. 8.

As shown in FIG. 10, the glass opening 17 has an opening edge where a peripheral wall 19 extends toward the rear of the vehicle. The peripheral wall 19 has an upper wall 19a, a lower wall 19b, and left and right side walls 19c, 19c. The inner panel 1a has ribs 13 extending in the up-down direction between the glass opening 17 and the lower edge portion 15. Each of the ribs 13 has an upper end portion 13a disposed in contact with or in proximity to a lower end portion of a corresponding side wall 19c. Each of the ribs 13 has a lower end portion 13b disposed in proximity to the lock device 18. The rib 13 inclines in such a way that the rib 13 is located closer to the lock device 18 (vehicle width direction central portion) as it extends from the upper end portion 13a to the lower end portion 13b. The attachment surface portion 11, the side wall 19c and the rib 13 are disposed so that they extend from the hinge 6 (see FIG. 5) to the vicinity of the lock device 18. The attachment surface portion 11, the side wall 19c and the rib 13 extend contiguously or intermittently. The rib 13 will be described in detail later.

According to the present embodiment, the outer panel 1b, shown in FIG. 1, is formed of a resin material. The outer panel 1b has an upper outer panel 21 and a lower outer panel 22 respectively arranged on upper and lower sides with the glass opening 17 therebetween.

The upper outer panel 21 covers the upper edge portion 14 of the inner panel 1a from the rear side. The upper outer panel 21 has a spoiler-like shape with a long length in the vehicle width direction. The upper outer panel 21, shown in FIG. 7, has: an upper surface 21a that extends substantially horizontally in the front-rear direction and the vehicle width direction; a first inclined surface 21b that extends obliquely downward and forward from a rear end of the upper surface 21a; and a second inclined surface 21c that extends obliquely downward and rearward from a lower end of the first inclined surface 21b.

The lower outer panel 22, shown in FIG. 1, covers a lower end side of the inner panel 1a from the rear side. The lower outer panel 22 has a rectangular shape with a long length in the vehicle width direction. The lower outer panel 22 is formed separately from the upper outer panel 21.

The mid panel 1c, shown in FIG. 3, is a metal member that reinforces the tailgate 1. The mid panel 1c has: a plurality of linear portions extending in the vehicle width direction; and a plurality of crossing portions that intersect the linear portions (at right angles or at oblique angles), and is substantially lattice-shaped.

As shown in FIG. 5, the stiffener 1d is a metal member attached to the inner panel 1a together with the hinge 6. The stiffener 1d serves as a reinforcing member that improves the rigidity of a surrounding portion of the hinge attachment portion 12. The stiffener 1d has: a main body surface portion 31 on the vehicle width direction outer side of the stiffener 1d, a first surface portion 32 that is continuous with a vehicle width direction inner portion of the main body surface portion 31; and a second surface portion 33 that is continuous with a vehicle width direction inner portion of an upper end portion of the first surface portion 32.

As shown in FIG. 4, the main body surface portion 31 extends in the up-down direction and the vehicle width direction along the upper edge portion 14 and the side edge portion 16 of the inner panel 1a. The main body surface portion 31 has a plurality of beads 34 thereon, each of which extends in the vehicle width direction and bulges in a direction away from the inner panel 1a (bulges rearward). The plurality of beads 34 are spaced apart from each other in the up-down direction. The main body surface portion 31, shown in FIG. 5, is arranged such that the main body surface portion 31 is spaced apart rearward relative to the inner panel 1a. Incidentally, the main body surface portion 31 may be arranged such that the main body surface portion 31 abuts the inner panel 1a. A vehicle outer side portion of the main body surface portion 31, shown in FIG. 6, has a step projecting toward the inner panel 1a and fixed to the inner panel 1a with an adhesive 7. The first surface portion 32 is fixed to the side wall 19c with the adhesive 7. The stiffener 1d and the inner panel 1a, shown in FIG. 6, define a closed cross-section 35 therebetween. The main body surface portion 31 has a lower end portion fixed to the mid panel 1c with a bolt B (see FIG. 3).

As shown in FIGS. 5 and 6, the first surface portion 32 is formed along the attachment surface portion 11 and the side wall 19c and extends in a direction substantially perpendicular to the vehicle width direction (extends in the up-down direction and the front-rear direction). The first surface portion 32 is substantially parallel to a plane whose normal is in the direction in which the rotating shaft 61 extends. The first surface portion 32 intersects the main body surface portion 31 (at a substantially right angle in the embodiment). The first surface portion 32 and the main body surface portion 31 define a substantially L-shaped cross-section in transverse cross-sectional view. The first surface portion 32 has a plurality of stiffener-side attachment portions 36, which are through-holes. The stiffener-side attachment portions 36 are attached to the inner panel 1a and the hinge 6 and they are formed at positions corresponding to the hinge attachment portions 12.

The second surface portion 33 is formed along the upper edge portion 14 of the inner panel 1a and extends in the up-down direction and the vehicle width direction. The second surface portion 33 intersects the first surface portion 32 (at a substantially right angle in the embodiment). The first surface portion 32 and the second surface portion 33 define a substantially L-shaped cross section in transverse cross-sectional view. The second surface portion 33 is joined to the inner panel 1a with a bolt B. The second surface portion 33 has a through-hole 37 formed therein through which the bolt B is inserted. As shown in FIG. 4, the through-hole 37 is located on a vehicle width direction inner side relative to the stiffener-side attachment portions 36 and in between the two stiffener-side attachment portions 36, 36 with respect to the up-down direction (at an intermediate point between the stiffener-side attachment portions 36, 36 in the embodiment).

Figure 9:
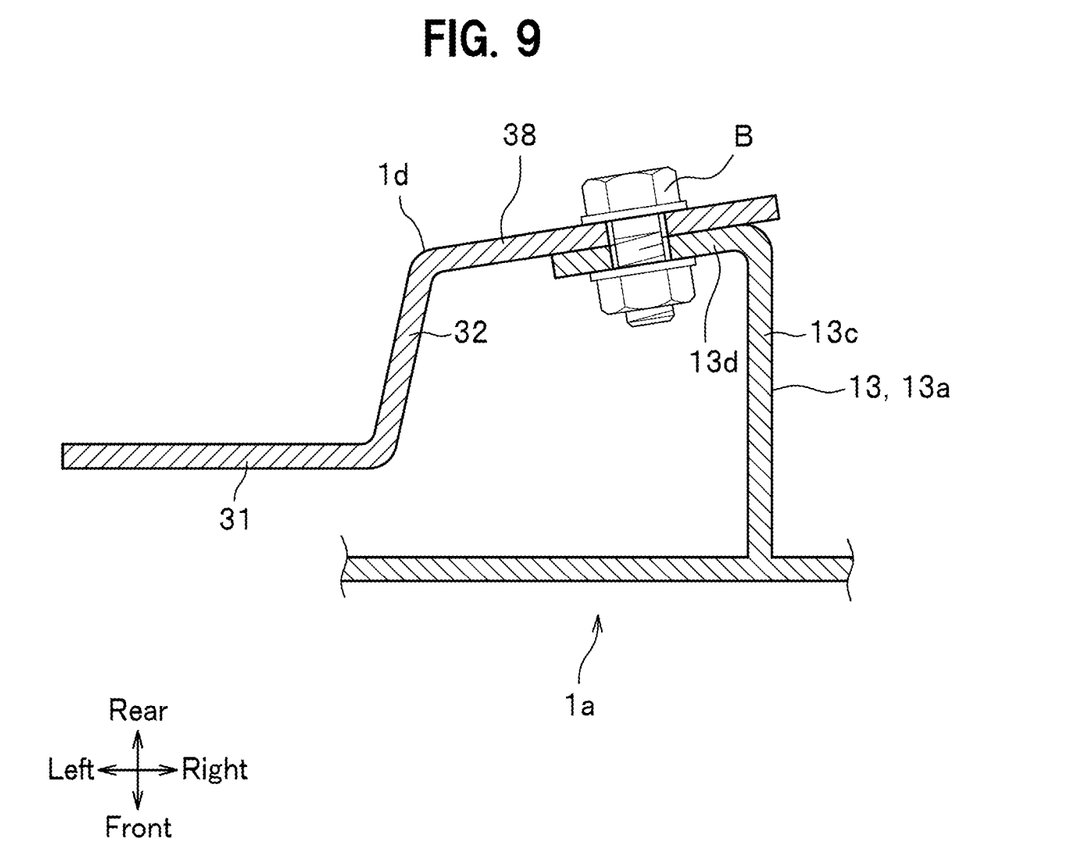
FIG. 9 is a cross-sectional view taken along line IX-IX in FIG. 8.

Referring to FIGS. 8 and 9, the attachment structure of the stiffener 1d and the inner panel 1a will be described in detail. FIG. 9 is a cross-sectional view taken along line IX-IX in FIG. 8. The first surface portion 32 has a lower end portion on which a flange surface portion 38 extending in the up-down direction and the vehicle width direction is formed. The first surface portion 32 and the flange surface portion 38 define a substantially L-shaped cross section in planar cross-sectional view.

The rib 13, shown in FIG. 9, includes a proximal end surface portion 13c extending rearward from a rear surface of the inner panel 1a and a distal end surface portion 13d extending from an extension end of the proximal end surface portion 13c toward an intersecting direction, and defines a substantially L-shaped cross section in planar cross-sectional view. The proximal end surface portion 13c extends in a direction substantially perpendicular to the vehicle width direction (extends in the up-down direction and the front-rear direction). The proximal end surface portion 13c is substantially parallel to the first surface portion 32. The proximal end surface portion 13c corresponds to the third surface portion described in Claims. The distal end surface portion 13d extends in the up-down direction and the vehicle width direction. The distal end surface portion 13d is super-imposed on the flange surface portion 38 in the front-rear direction and they are joined to each other with a bolt B. With this structure, the first surface portion 32 and the proximal end surface portion 13c are coupled to each other via the flange surface portion 38 and the distal end surface portion 13d. In other words, the upper end portion 13a of the rib 13 is coupled to the lower end portion of the first surface portion 32 via the flange surface portion 38. The first surface portion 32 and the rib 13, shown in FIG. 8, are arranged in such a way as to be continuous as a whole in the up-down direction.

The open stays 5, shown in FIG. 2, serve to assist opening of the tailgate 1 and maintain the tailgate 1 in a predetermined position (for example, in a full-open position). Each of the open stays 5 is installed in such a way that the open stay 5 is located in front of the corresponding side edge portion 16 of the inner panel 1a in a state where the tailgate 1 is closed. The open stay 5 has an upper end portion pivotally supported by the vehicle body 4 (see FIG. 1) via a bracket 51. The open stay 5 has a lower end portion pivotally supported by the inner panel 1a via a bracket 52. The open stay 5 is installed at a position shifted in the vehicle width direction with respect to the corresponding hinge 6. According to the present embodiment, the open stay 5 is located outward in the vehicle width direction relative to the corresponding hinge 6.

The hinges 6 are metal members that pivotally support the tailgate 1 with respect to the vehicle body 4. The hinges 6 are respectively disposed on the left and right sides of the upper edge portion 14 of the inner panel 1a. As shown in FIG. 5, each of the hinges 6 has the rotating shaft 61 extending substantially parallel to the vehicle width direction, a door-side hinge member 62 joined to the tailgate 1, and a vehicle body-side hinge member 63 joined to the vehicle body 4.

The rotating shaft 61 intersects the attachment surface portion 11 and the first surface portion 32 (at a substantially right angle in the embodiment). The axial line of the rotating shaft 61 is substantially parallel to the axial line of the bolt B that fastens the inner panel 1a, stiffener 1d, and the hinge 6 to one another.

The door-side hinge member 62 is a plate-like portion that extends substantially parallel to a plane whose normal is in the direction in which the rotating shaft 61 extends. The door-side hinge member 62 has through-holes 64 formed therein through which bolts B are respectively inserted. The through-holes 64 are formed at positions corresponding to the hinge attachment portions 12 and the stiffener-side attachment portions 36. The door-side hinge member 62, the attachment surface portion 11 of the inner panel 1a, and the first surface portion 32 of the stiffener 1d are fixed to one another with the bolts B inserted from the vehicle width direction inner side. The door-side hinge member 62 is located on the hinge attachment portions 12, on a vehicle width direction inner side relative to the stiffener 1d.

The vehicle body-side hinge member 63 is a plate-like portion connected to the door-side hinge member 62 so as to be able to rotate relative to the door-side hinge member 62 via the rotating shaft 61, and is substantially L-shaped. The vehicle body-side hinge member 63 has a distal end surface portion 63a extending substantially parallel to the rotating shaft 61. The distal end surface portion 63a of the vehicle body-side hinge member 63 has a plurality of connection pins 65 disposed thereon for connecting with the vehicle body 4. In a state where the tailgate 1 is closed, shown in FIG. 7, the door-side hinge member 62 and the vehicle body-side hinge member 63 are disposed at positions such that the door-side hinge member 62 and the vehicle body-side hinge member 63 overlap the upper surface 21a of the upper outer panel 21 when viewed in the up-down direction. The door-side hinge member 62 and the vehicle body-side hinge member 63 are disposed at positions such that the door-side hinge member 62 and the vehicle body-side hinge member 63 overlap the first inclined surface 21b of the upper outer panel 21 when viewed in the front-rear direction. In other words, door-side hinge member 62 and the vehicle body-side hinge member 63 are covered by the upper outer panel 21 from above and from the rear side.

Hereinafter, a procedure for attaching the tailgate 1 and the hinge 6 will be described. The attachment procedure may be such that, first, the vehicle body-side hinge member 63 of the hinge 6 is attached to the vehicle body 4 and then the tailgate 1 is attached to the door-side hinge member 62. Alternatively, the attachment procedure may be such that, first, the door-side hinge member 62 is attached to the tailgate 1 and then the vehicle body 4 is attached to the vehicle body-side hinge member 63. That is, there is no restriction in the attachment procedure, and the attachment work can be easily performed with either attachment procedure.

The vehicle V provided with the door structure according to the embodiment of the present invention is basically structured as described above. Next, the operations and advantageous effects of the door structure will be described.

According to the present embodiment, the tailgate 1 serving as the door body has: the attachment surface portion 11 substantially parallel to a plane whose normal is in the direction in which the rotating shaft 61 extends; and the hinge attachment portion 12 formed on the attachment surface portion 11 and being for attaching the hinge 6 thereto. This means that the hinge 6 is attached to the attachment surface portion 11 substantially parallel to the plane whose normal is in the direction in which the rotating shaft extends. With this structure, the direction in which the attachment surface portion 11 extends is substantially parallel to the direction in which the load from the hinge 6 is applied to the attachment surface portion 11. As a result, the tailgate 1 can provide a bearing force against the inputted load in a desirable way.

In addition, by improving the bearing force of the tailgate 1, the attachment position of the hinge 6 can be freely selected and thus it is possible to arrange the rotating shaft 61 at a position away from the door opening 41 as far as possible. This allows use of a wide space through the door opening 41 when the tailgate 1 is opened.

According to the present embodiment, the stiffener 1d serving as a reinforcing member has the first surface portion 32 formed along the attachment surface portion 11. Thus, the direction in which the first surface portion 32 extends is substantially parallel to the direction in which the load from the hinge 6 is applied to the attachment surface portion 11. As a result, the bearing force of the whole of the stiffener 1d and the tailgate 1 is exerted against the inputted load in a desirable way.

According to the present embodiment, the stiffener 1d has: the first surface portion 32 substantially parallel to a plane whose normal is in the direction in which the rotating shaft 61 extends; and the second surface portion 33 that intersects the first surface portion 32 and is continuous with the first surface portion 32, so that the first surface portion 32 and the second surface portion 33 define a substantially L-shaped portion. With this structure, even when a load inputted in a direction substantially parallel to the plane whose normal is in the direction in which the rotating shaft 61 of the tailgate 1 extends or a load inputted in a direction that intersect the plane is applied to the stiffener 1d, the bearing force of the stiffener 1d can be exerted against the inputted load in a desirable way and the deformation of the stiffener 1d and the tailgate 1 can be restrained.

According to the present embodiment, the second surface portion 33 is joined to the inner panel 1a of the tailgate 1. This makes it possible to receive the load inputted to the second surface portion 33 by the whole of the tailgate 1 in a distributed manner.

The tailgate 1 of the present embodiment has the rib 13 including the proximal end surface portion 13c substantially parallel to the first surface portion 32. The rib 13 has the upper end portion 13a on one end side of the rib 13 and the lower end portion 13b on the other end side of the rib 13. The upper end portion 13a is joined to a lower end portion of the first surface portion 32 via the flange surface portion 38. The lock device 18 is arranged on a side of the lower end portion 13b. In addition, according to the present embodiment, the rib 13 is disposed in such a way that the rib 13 is located closer to the lock device 18 as the rib 13 extends from the upper end portion 13a to the lower end portion 13b. Thus, the load inputted form the hinge 6 can be received even with the lock device 18 via the first surface portion 32 and the rib 13, and therefore the rigidity of the tailgate 1 can be improved as a whole.

According to the present embodiment, the hinge 6 is located on the vehicle width direction inner side of the hinge attachment portion 12, i.e., on the vehicle inner side relative to the stiffener 1d. Thus, the head portions of the bolts B serving as fixing means for fixing the hinge 6 to the tailgate 1 face toward the inside of the vehicle and are not exposed to the outside. For this reason, it is not necessary to provide an additional member such as a cover or extension of the tailgate 1 for covering the bolts B, and thus the safety inside the vehicle is secured with a simple structure.

In addition, according to the present embodiment, as hinge 6 is located on the vehicle width direction inner side of the hinge attachment portion 12, i.e., on the vehicle inner side relative to the stiffener 1d, the open stay 5 can be arranged on the vehicle width direction outer side relative to the hinge 6, resulting in good space efficiency in the vehicle width direction.

Moreover, according to the present embodiment, as each hinge 6 is located on the vehicle width direction inner side of the hinge attachment portion 12, i.e., on the vehicle inner side relative to the stiffener 1d, the distance between the two hinges 6 disposed left-right symmetrically with respect to a vehicle width direction center of the tailgate 1 becomes short, resulting in an improvement in the rigidity of the tailgate 1 between the left and right hinges 6, 6.

According to the present embodiment, in a state where the tailgate 1 is closed, the door-side hinge member 62 and the vehicle body-side hinge member 63 are disposed at positions such that the door-side hinge member 62 and the vehicle body-side hinge member 63 overlap the upper outer panel 21 when viewed in an up-down direction. Thus, the upper outer panel 21 can cover the door-side hinge member 62 and the vehicle body-side hinge member 63. For this reason, it is not necessary to provide an additional member such as a cover or extension of the tailgate 1 for covering the bolts B serving as fixing means, and thus the safety inside the vehicle is secured with a simple structure.

According to the present embodiment, the inner panel 1a is formed of a resin material. Therefore, the attachment surface portion 11 and the proximal end surface portion 13c, which is the third surface portion, are easily formed in comparison with a case where the inner panel 1a is formed of a metal material.

It is conceivable to raise a rib from the inner panel to form the first surface portion 32. However, in this case, a sink mark may be formed on the rear surface of the inner panel 1a, and, if the sink mark is formed on a portion where the sealing between the inner panel 1a and the vehicle body 4 is to be made, it is difficult to precisely forma sealing line. In contrast, according to the present embodiment, the first surface portion 32 is formed on the stiffener 1d, which is provided separately from the inner panel 1a. This structure allows restraining sink marks from being formed on the rear surface of the inner panel 1a, and allows forming a seal line precisely.

According to the present embodiment, the attachment surface portion 11, the side wall 19c and the rib 13 extend contiguously or intermittently, from the hinge 6 to the vicinity of the lock device 18. Therefore, the load inputted form the hinge 6 can be received even with the lock device 18 via the attachment surface portion 11 and the rib 13, and thus the rigidity of the tailgate 1 can be improved as a whole.

The embodiment of the present invention has been described in detail with reference to the drawings. However, the present invention is not limited to this embodiment, and may be modified as needed within the scope not departing from the gist of the present invention.

In the present embodiment, the present invention has been applied to a door structure for opening a door upward. However, the present invention may also be applied to a swing open door structure having a tailgate 1 that rotates about a side end thereof. In addition, in the present embodiment, the present invention has been applied to a hatchback vehicle. However, the present invention may also be applied to a vehicle with a trunk.

Although the inner panel 1a and the outer panel 1b according to the present embodiment are formed of a resin material, they may be formed of a metal material. Although the stiffener 1d according to the present embodiment is formed of a metal material, it may be formed of a resin material. Although the present embodiment has been described as including the stiffener 1d, the stiffener 1d may be omitted.

According to the present embodiment, the through-hole 37 is formed on the vehicle width direction inner side relative to the stiffener-side attachment portion 36. However, the through-hole 37 may be formed on the vehicle width direction outer side relative to the stiffener-side attachment portion 36. In this case, the attachment surface portion 11 is formed to have a rear end from which a tab-shaped attachment portion extends outward in the vehicle width direction; the stiffener 1d is formed to have a portion extending along the attachment portion; and the attachment portion and the portion of the stiffener 1d is coupled to each other with joining means. Examples of the joining means include bolts and nuts, adhesives, and clips.

Each of the open stays 5 according to the present embodiment is arranged on the outer side in the vehicle width direction relative to the corresponding hinge 6. However, the open stay 5 may be arranged on the inner side in the vehicle width direction relative to the corresponding hinge 6, or they may be arranged at the same position with respect to the vehicle width direction.

REFERENCE SIGNS LIST

V vehicle (door structure)
1 tailgate (door body)
1a inner panel
11 attachment surface portion
12 hinge attachment portion
13 rib
13a upper end portion (one end portion)
13b lower end portion (other end portion)
13c proximal end surface portion (third surface portion)
18 lock device
1b outer panel
21 upper outer panel
1d stiffener (reinforcing member)
32 first surface portion
33 second surface portion
4 vehicle body
41 door opening
5 open stay
6 hinge
61 rotating shaft
62 door-side hinge member
63 vehicle body-side hinge member
B bolt (fixing means)

The invention claimed is:

1. A door structure for opening and closing a door opening provided on a vehicle body, the door structure comprising:
a door body; and
a hinge that pivotally supports the door body with respect to the vehicle body,
wherein the door body comprises: an attachment surface portion substantially parallel to a plane whose normal is in a direction in which a rotating shaft of the hinge extends; and
a hinge attachment portion formed on the attachment surface portion and being for attaching the hinge thereto,
wherein the door body is provided with a reinforcing member attached to the door body together with the hinge,
wherein the reinforcing member has: a first surface portion formed along the attachment surface portion; a second surface portion that intersects the first surface portion and is continuous with the first surface portion; and a flange surface portion that is continuous with the first surface portion and substantially parallel to the second surface portion,
wherein the door body comprises a rib and a lock device, the rib comprising a third surface portion and a distal end surface portion, the third surface portion being substantially parallel to the first surface portion, the distal end surface portion being continuous with the third surface portion and joined to the flange surface portion in a state where the distal end surface portion is in surface-to-surface contact with the flange surface portion, the lock device being adapted to lock the door body to the vehicle body,
wherein the flange surface portion and the distal end surface portion extend in a vehicle width direction,
wherein the rib has one end portion coupled to the first surface portion via the flange surface portion, and the lock device is arranged on a side of another end portion of the rib, and
wherein the rib is disposed in such a way that the rib is located closer to the lock device as the rib extends from the one end portion to the another end portion of the rib.

2. The door structure of claim 1,
wherein the second surface portion is joined to the door body.

3. The door structure of claim 2,
wherein the hinge has a door-side hinge member joined to the door body and a vehicle body-side hinge member joined to the vehicle body, and
wherein, in a state where the door body is closed, the door-side hinge member and the vehicle body-side hinge member are disposed at positions such that the door-side hinge member and the vehicle body-side hinge member overlap the door body when viewed in an up-down direction.

4. The door structure of claim 1,
wherein the hinge is on a vehicle inner side relative to the reinforcing member, at the hinge attachment portion.

5. The door structure of claim 4,
wherein the hinge has a door-side hinge member joined to the door body and a vehicle body-side hinge member joined to the vehicle body, and
wherein, in a state where the door body is closed, the door-side hinge member and the vehicle body-side hinge member are disposed at positions such that the door-side hinge member and the vehicle body-side hinge member overlap the door body when viewed in an up-down direction.

6. The door structure of claim 1, wherein the hinge has a door-side hinge member joined to the door body and a vehicle body-side hinge member joined to the vehicle body, and wherein, in a state where the door body is closed, the door-side hinge member and the vehicle body-side hinge member are disposed at positions such that the door-side hinge member and the vehicle body-side hinge member overlap the door body when viewed in an up-down direction.

\* \* \* \* \*